Aug. 16, 1938.　　　W. F. PLOETZ　　　2,127,344
CLUTCH
Filed Jan. 18, 1934　　　2 Sheets-Sheet 1
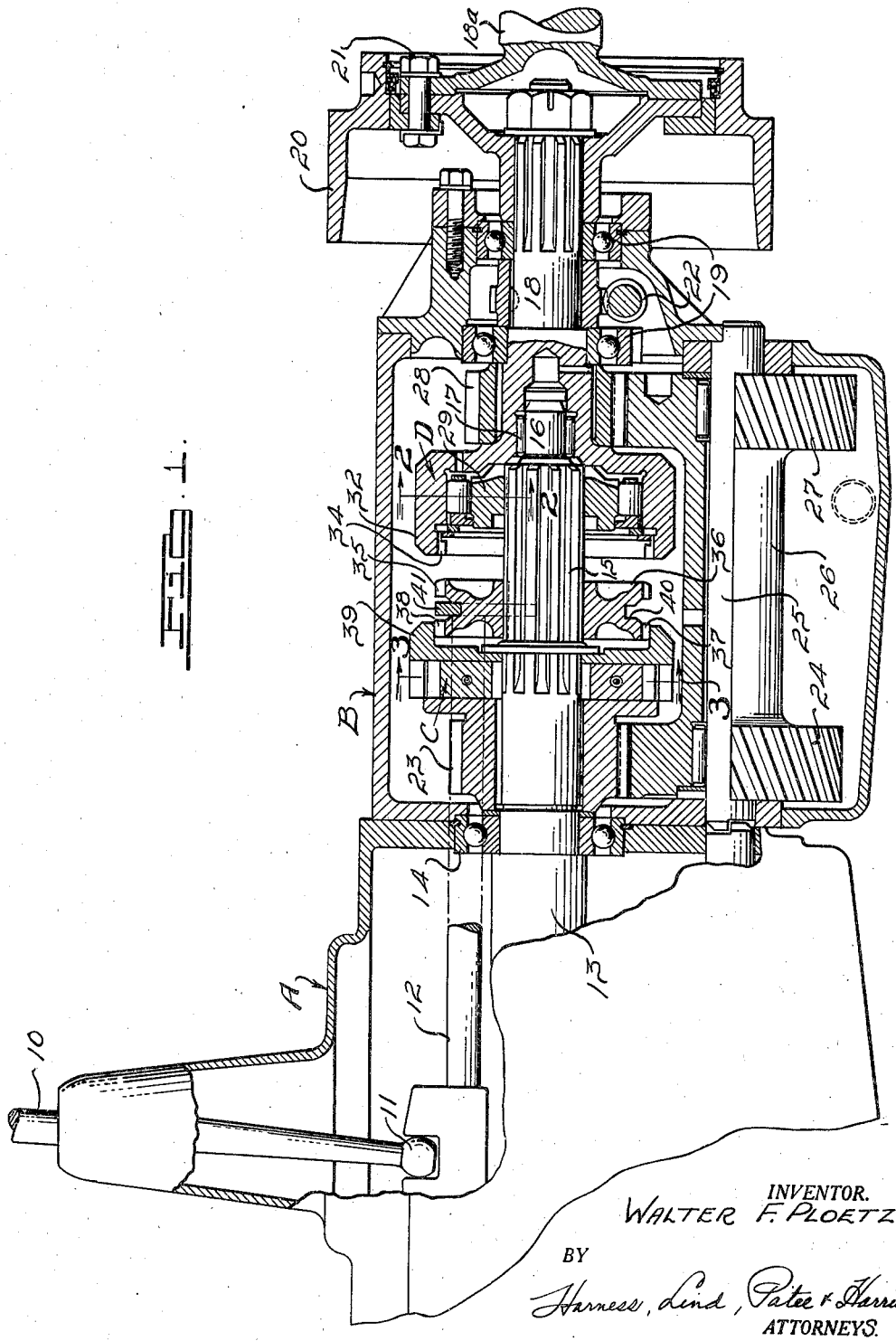
INVENTOR.
WALTER F. PLOETZ
BY
Harness, Lind, Patee & Harris
ATTORNEYS.

Aug. 16, 1938.  W. F. PLOETZ  2,127,344
CLUTCH
Filed Jan. 18, 1934  2 Sheets-Sheet 2
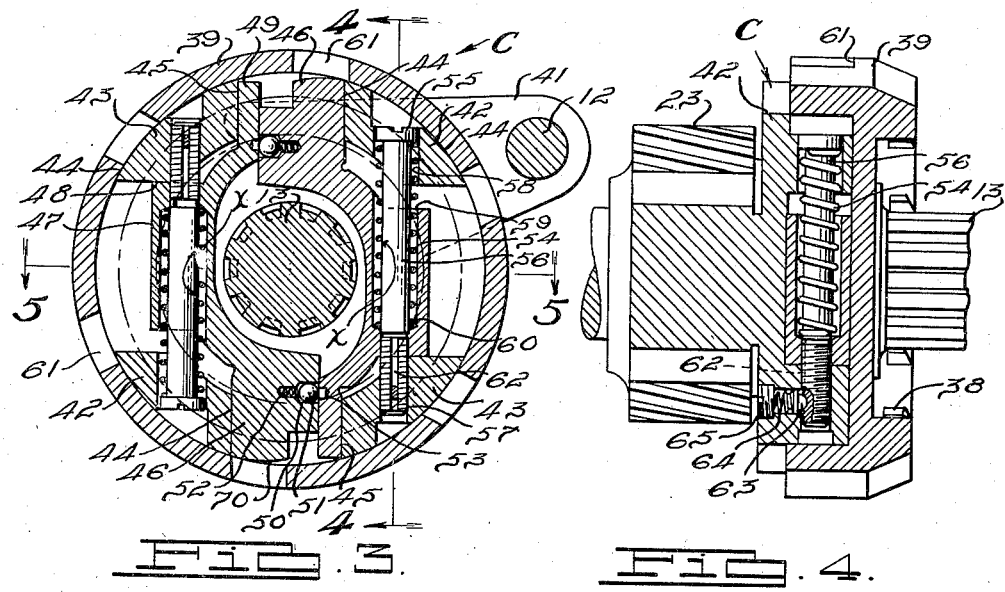
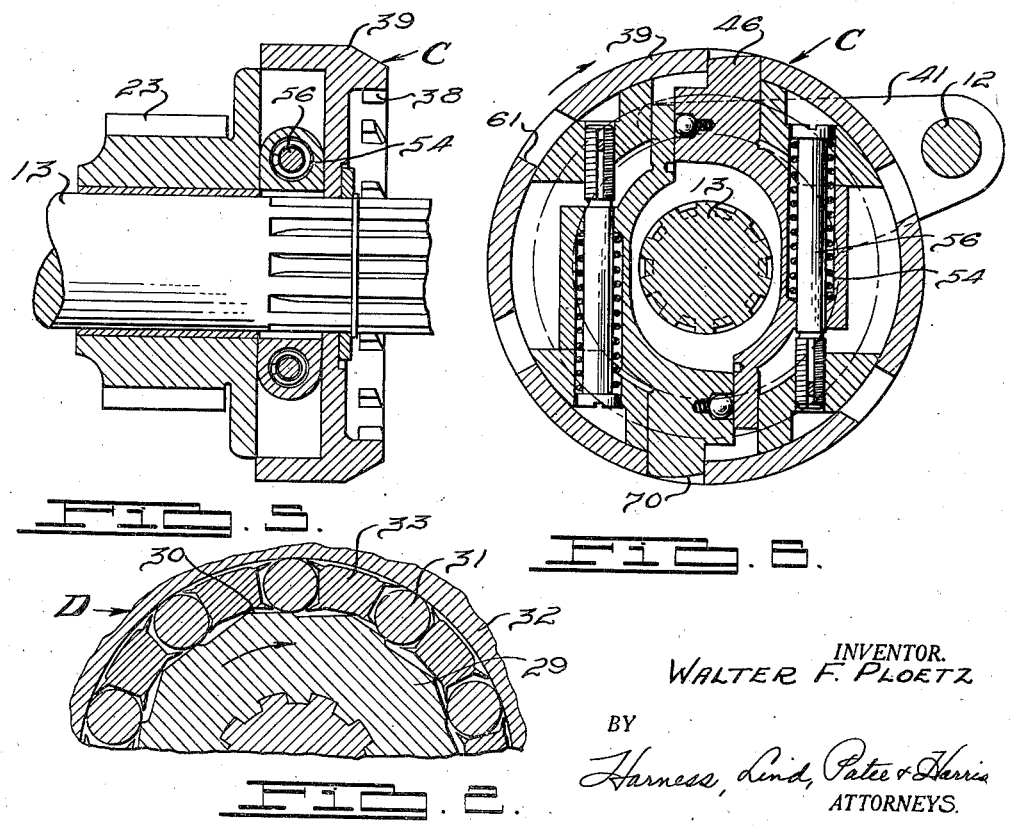
INVENTOR.
WALTER F. PLOETZ
BY
Harness, Lind, Patee & Harris
ATTORNEYS.

Patented Aug. 16, 1938

2,127,344

UNITED STATES PATENT OFFICE 2,127,344

CLUTCH

Walter F. Ploetz, Detroit, Mich., assignor to Chrysler Corporation, Detroit, Mich., a corporation of Delaware Application January 18, 1934, Serial No. 707,052

26 Claims. (Cl. 192—105)

This invention relates to clutches and refers more particularly to clutches of the type providing automatic engagement of relatively driven members.

It is an object of my invention to provide an improved clutch which will automatically connect parts in a driving mechanism and which will automatically release the connected parts under predetermined desired conditions of relative speeds of such parts.

A further object of my invention resides in the provision of an improved clutch having one or more pawls, dogs, or clutching members adapted to move into clutch engaging or disengaging positions in response to centrifugal forces acting on the pawls. I preferably provide a cage or core adapted to carry a plurality of pawls, and a sleeve or shell provided with suitable slots or openings respectively adapted to receive the pawls under the desired conditions of clutching action.

My improved clutch is particularly adapted for motor cars or vehicles, where it is desired to vary the driving speed ratio between the vehicle engine or prime mover and the propelling ground wheels. Thus, my invention may be used to advantage in transmissions and other driving mechanisms for effecting automatic changes in the driving speed ratio, the cage being driven by either the engine or the vehicle ground wheels and the shell by the other. Thus, by relatively driving the clutch members by the engine and car, the action of my clutch is responsive to conditions of car speed so as to automatically vary the driving speed ratio under desired conditions. Other uses of my clutch will be apparent from the teachings of my invention. In automatic clutches of the general type referred to above, difficulty has been experienced in providing the desired control of the pawl movement. One reason for such difficulties resides in the location of the center of mass of such pawls relatively remotely from the axis of rotation of the pawl carrying member. Ordinarily, it is desirable to provide a relatively small movement of the pawls when moving into the clutching position, and with such prior devices, the distance of radial displacement of the center of mass is only a small percentage of the distance from the axis of rotation to the center of mass. It is generally desired to restrain movement of the pawls until predetermined speed of the clutch parts have been reached, and where such speeds are relatively great it will be apparent that the spring means restraining pawl movement must exert considerable force on the pawls. As a matter of practice it is therefore difficult, if not impossible, with prior clutches of the type referred to, to provide spring means which will properly restrain the pawls until the desired clutching conditions are reached; which will thereupon permit the pawls to quickly engage the slots of the companion clutch member; and which will thereafter retract the pawls to release the clutch parts at the desired generally small speed differential as clutch engagement takes place.

It is a further object of my invention to provide an automatic clutch of the character referred to, wherein the centers of mass of each of the pawls lies in close proximity to the axis of rotation of the pawl carrying cage whereby the radial movement thereof is a relatively large percentage of the distance from the axis of rotation to the center of mass of each pawl. By reason of such novel arrangements, I am enabled to provide spring means having the desired characteristics for providing improved clutching and declutching actions and I am further enabled to overcome the aforesaid difficulties. In the preferred form of my invention, I provide spring means acting on the pawls and substantially balancing the centrifugal forces acting thereon at the predetermined desired speed at which initial pawl clutching movement takes place. Obviously spring means having other characteristics may be employed as desired and as conditions require, and I do not limit my invention in its broader aspects to any particular spring characteristic.

Further objects of my invention reside in the provision of an improved automatic clutch of the character referred to, wherein the pawls extend substantially across the pawl carrying cage for cooperation in an improved manner with the spring means action thereon and for improved guiding and bearing action for the pawls. Such arrangement further facilitates convenient adjustment and replacement of the spring means from the outside of the clutch and without requiring disassembly thereof.

A still further object of my invention is to provide means for yieldingly holding the pawls against movement, such means automatically releasing the pawls at the proper speed of the pawl carrying cage. This feature of my invention prevents "hunting" action of the pawls and is otherwise desirable in holding the clutch parts against rattling and premature movement. This yielding holding means for the pawls has a further important characteristic in connection with the pawl engaging action at the predetermined desired speed for clutch engagement. By substantially balancing the pawls as to the opposing forces exerted thereon by the rate of the spring means and the centrifugal force at the critical speed, I have provided a clutching engagement and disengagement which will automatically take place over a relatively small speed differential, the differential being occasioned largely by reason of a certain amount of static frictional resistance to movement of the pawls. When this static friction is overcome, the pawls quickly engage or disengage as the case may be, according to other conditions which will be hereinafter more apparent. The aforesaid yielding holding means, which may be in the form of a ball detent with cooperating spring, accentuates this frictional dwell effect to the pawl movement so that when the pawls are once moved free of the detents they will quickly advance into the clutching position.

Further objects and advantages of my invention reside in the novel combination and arrangement of parts more particularly hereinafter described and claimed, reference being had to the accompanying drawings in which:

Fig. 1 is a cross-sectional elevational view through the power transmission mechanism illustrating my clutch as a part thereof.

Fig. 2 is an enlarged sectional view through line 2—2 of Fig. 1 showing a portion of the free wheeling or overrunning clutch.

Fig. 3 is an enlarged sectional view through line 3—3 of Fig. 1 showing my improved clutch.

Fig. 4 is a sectional view through the clutch shown in Fig. 3, the section being taken along line 4—4 thereof.

Figure 5 is a sectional view taken along line 5—5 of Fig. 3.

Fig. 6 is a view of the clutch shown in Fig. 3, the parts being shown in the clutch engaging position.

In the drawings, I have illustrated my clutch in a power transmitting mechanism for a motor vehicle, such mechanism including the transmission A and the auxiliary transmission or overdrive mechanism B at the rear end thereof.

The transmission A may be of any suitable type such as the conventional selector type operated by the well known shifter lever 10, the operating end 11 of which is illustrated in Fig. 1 in engagement with the reverse selector 12 ready to move the selector to the right for effecting the usual reverse drive through the transmission. The purpose of such arrangement will be presently apparent. The usual motor vehicle engine or prime mover (not shown) is adapted to transmit power in the customary manner, for example, through transmission A, the power being taken off by a drive shaft 13 rotatably supported in bearings, one of which is illustrated at 14.

Shaft 13 extends rearwardly into the over drive mechanism B and is splined at 15 adjacent the end 16 thereof which is centered by bearing 17 in the forwardly extending end of driven shaft 18, 18a. This driven shaft is mounted in suitable bearings 19 and extends rearwardly for driving the rear vehicle wheels (not shown) in the customary manner. If desired, the usual propeller shaft brake drum 20 may be mounted by a series of fasteners 21 in fixed relation with shaft 18, the shaft portion 18, 18a being thereby connected as a unit. If desired, the usual speedometer drive may be taken from shaft 18 by reason of the gearing illustrated at 22.

Freely mounted on shaft 13 at the front end of the overdrive mechanism B, is a gear 23 driven by a gear 24 rotatable on a fixed countershaft 25 and having an integral sleeve 26 formed with a gear 27. The latter gear is driven by gear 28 keyed to shaft 18, the countershaft gearing 28, 27, 24, 23 being thereby adapted to at all times drive the automatic clutch C from and with the driven shaft 18. The countershaft gear train determines the overdrive ratio as will be presently apparent, and when shaft 13 is directly driving the shaft 18 through the overrunning clutch or free wheeling clutch D, the automatic clutch C will be driven at a slower speed than that of the drive shaft 13, it being understood that, in such instance, clutch C is not in clutching position.

The free wheeling clutch D, best shown in Fig. 2, may be of any suitable form, the illustration showing a conventional device in which the inner cam member 29 is driven by the splines 15 of shaft 13, the cam faces 30 being engaged by cylinders 31 so that for the driving rotation of shaft 13 (clockwise as viewed in Fig. 2) the high sides of cam faces 30 will wedge the cylinders 31 between cam member 29 and the outer driven free wheeling member or pineapple 32 to establish a direct drive thereto. The usual spacer 33 maintains the cylinders in spaced position, it being apparent that whenever the engine slows down, the vehicle may, by reason of clutch D, overrun shaft 13, other conditions permitting such action as will be presently apparent. As shown in Fig. 1 the driven member 32 may be formed as an extension of shaft 18 or otherwise connected thereto in driving relation.

The driven free wheeling member 32 is formed with internal jaws or teeth 34 adapted to be engaged and locked with corresponding jaws or teeth 35 of a control or clutch sleeve 36 having splined engagement with splines 15. This sleeve has a second set of jaws or teeth 37 shown, in Fig. 1, in engagement with corresponding teeth internally formed at 38 on the shell 39 of clutch C, this shell being centered by shaft 13 but freely rotatable with respect thereto except when coupled therewith by reason of sleeve 36 as shown in Fig. 1.

Sleeve 36 has an annular groove 40 adapted to receive the shifter element 41 carried by the rear end of the reverse selector 12 so that when the shift lever 10 is actuated to move selector 12 to establish a reverse drive of shaft 13, as in reversing the motor vehicle, the sleeve 36 is thereby moved along splines 15 to disengage teeth 37, 38 and thereafter engage teeth 34, 35 in order to lock out the free wheel clutch D. It will be understood that I have omitted the details of the gearing of transmission A as such parts are well known in the art and require no disclosure in detail.

Referring now to my automatic clutch C, best shown in Figs. 3 to 6, the gear 23 is provided with diametrically arranged pairs of lateral extensions or pawl guides 42 and 43, these extensions having arcuate faces 44 fitting within shell 39 as shown in Fig. 3. Extensions 42 have pawl engaging faces 44 and extensions 43 have similar bearing faces 45. Fitting within shell 39 are a pair of pawls 46, each having a face in sliding engagement with a face 44 of extension 42 and each extending generally inwardly of the pawl carrying cage comprising the clutch parts within shell 39. Thus each pawl is formed with a yoke portion 47 normally seated at 48 on an extension 43, each yoke portion having a guide 49 slidable intermediate a face 45 and the side of the other pawl opposite the side thereof in engagement with the face 44. Each pawl has a slot 50 receiving a ball detent 51 urged outwardly thereof by a spring 52 for engaging the ball in a keeper 53 of the end 49 associated therewith.

In order to normally urge the pawls inwardly of the pawl cage to position the parts as shown in Fig. 3 I have provided springs 54, each spring reacting on the head 55 of the screw bolt 56 threadedly engaging opening 57 in extension 42 and yoke portions 47 are respectively provided with openings 58 and 59 aligned with opening 57, each spring 54 acting on a seat 60 of the associated yoke portion 47.

The shell 39 has a plurality of circumferentially spaced pawl receiving slots or openings 61 suitably spaced so that diametrically arranged pairs of slots will simultaneously register with the pawls 46 so as to receive said pawls under conditions hereinafter more apparent.

The threaded ends of screw bolts 56 are each slotted at 62 to receive the detent 63, shown in Fig. 4, urged toward the slot by a spring 64 abutting set screw 65. It will be apparent that the pawl springs 54 may be readily reached and adjusted from without shell 39 by aligning each of the bolt heads 55 with one of the slots 61. Prior to rotatably adjusting the screw bolts, the locks 63 associated therewith are released by removing the tension of springs 64 by partially threading the set screws 65 outwardly. The screw bolts 55 may then be rotated to further compress or relieve the springs 55 to effect the desired setting governing the action of the pawls, after which the detents 63 are restored to their positions locking the associated bolts against accidental displacement. Furthermore, by aligning any bolt 56 with one of the shell openings 61, the bolt and spring 54 may be readily removed and replaced without tearing down the clutch parts.

The outer ends of pawls 46 are preferably provided with cam faces 70 acting on the inner edges of slots 61 to progressively release the pawls outwardly when the clutch shell and cage are rotating substantially together at a predetermined speed. When pawls 46 move outwardly in slots 61, such movement is limited by engagement of yoke portions 47 with projections 42, the yoke portions sliding on bolts 56.

In operation of the power transmitting mechanism, with the parts positioned as in Fig. 1, the engine will drive shaft 13 and hence the driven shaft 18, 18a to drive the vehicle forwardly in direct drive so far as the driving and driven shafts 13 and 18 respectively are concerned. This direct drive takes place from shaft 13, through the free wheel clutch D and thence to the driven shaft 18. When the vehicle tends to overrun the engine, such action may take place by reason of clutch D. During this direct drive the shell 39 will be driven by sleeve 36 at the speed of shaft 13 while the pawls will be rotated by gear 23 at a speed less than that of the driven shaft 18 by reason of the reduction through the countershaft gears 24, 27.

By way of illustrating one manner of operation of my automatic clutch C, this clutch is illustrated as being adapted to automatically lock out or to render the free wheel clutch D ineffective and to simultaneously drivingly connect sleeve 39 with gear 23 at a predetermined speed of rotation of shaft 18 and hence a predetermined speed of vehicle travel. When such clutching action takes place, the shaft 18 is driven from gear 23 as aforesaid and thence through the countershaft gear train to the shaft 18 such drive providing an overdrive or a higher speed of the driven shaft 18 than that of the driving shaft 13. An overdrive is ordinarily desirable at only relatively high speeds of vehicle travel and hence, by a suitable setting of the pawl springs 54, supplemented somewhat by ball detents 51, the pawls may be held inoperative against the influence of centrifugal forces acting to move the pawls outwardly, until the desired predetermined critical speed has been reached. Assuming, by way of example, that such automatic overdrive is desired at approximately 50 miles per hour of vehicle travel, then, when the vehicle is being driven at this speed, the pawls are urged outwardly by centrifugal force ready to engage slots 61 of shell 39 when rotation of the pawl cage and shell become substantially uniform. Under the assumed conditions, springs 54 may be set so that the pawls tend to fly outwardly at a speed of shaft 18 corresponding to 50 miles per hour of vehicle travel, the pawls being restrained from moving outwardly, until the clutch parts are synchronized, by reason of the gear reduction which drives the pawls at a slower speed than that of the slots 61 which are driven directly from the drive shaft 13. Owing to the difference in rotational speeds of the slots and pawls, these parts pass each other with such rapidity that the pawls do not have time to move outwardly to engage the slots and the parts continue to slip until the operator momentarily releases or diminishes the power of the engine applied to shaft 13 so as to permit the shell 39 to decelerate. In decelerating, the shell 39 obviously very quickly drops to the speed of the pawl cage, momentarily synchronizing the pawls with a pair of diametrically arranged slots, the pawls thereupon being guided out during rotation thereof, by cam faces 70 for effecting initial engagement of the pawls in the slots. Once engaged, the centrifugal force acting on the pawls carries them outwardly for fully engaging the slots of shell 39 and the overdrive immediately takes place with the free wheel clutch D locked out as aforesaid.

Prior to the speed at which it is desired to urge the pawls outwardly, the ball detents 51 stabilize the pawls against hunting of fluctuating movement, such detents also holding the parts against rattle.

As long as the engine drives the vehicle at or above the aforesaid overdrive speed, with the pawls 46 engaged in slots 61, the clutch C will remain engaged. However, when the vehicle slows down below the aforesaid 50 miles per hour, in the assumed illustration, the pawls 46 will be urged to their retracted or normal position of Fig. 3, such retraction taking place just as soon as the friction of the drive is relieved or reversed between the sides of the slots and pawls. Thus when the vehicle driver momentarily releases the usual accelerator pedal to cause the vehicle to drive the engine, this reversal of drive permits retraction of the pawls and the power transmission is then again operating without the overdrive and through the free wheeling clutch D.

When it is desired to drive the vehicle in reverse, shifter 12 is moved to actuate sleeve 36 to the right, as viewed in Fig. 1, so as to disengage teeth 37, 38 and to engage teeth 34, 35 to lock out the free wheel clutch D. This reverse drive thus passes from shaft 13 to sleeve 36, driven member 32 and thence to the driven shaft 18, it being understood that shaft 13 has its rotation reversed by the usual reversing mechanism of transmission.

In Fig. 6, I have illustrated the position of the pawls 46 when the automatic clutch C is in the clutching position for operating the overdrive.

I desire to point out that instead of driving the slot carrying sleeve directly from the drive shaft 13 and hence from the engine, and the pawl cage from the driven shaft 18, such parts may be readily reversed if desired so as to drive the pawl cage directly from the engine and the slots from the vehicle or driven shaft 18. The illustrated arrangement is preferred, however, where my automatic clutch is used in an overdraft mechanism, since the engine continues to drive at the overdrive speed from the time when the pawls are engaged in the pawl slots, viz. at a speed slower than in direct drive for the same vehicle speed. With the suggested reversal of clutch parts, the engine would have to operate considerably faster, by the overdrive ratio, then the driven shaft to speed up the slot carrying member and then by slowing down the engine momentarily to reduce the speed of the pawl cage to that of the slot carrying member, the pawls will engage the slots. In such instance, it is therefore apparent that the engine would have to drive at a speed greater than its speed for the overdrive setting of the pawls in order to establish the proper conditions for effecting actuation of the automatic clutch C.

While I have illustrated my clutch in connection with an overdrive mechanism for motor vehicles, I desire to point out that this is but one useful application or use of my clutch. My improved clutch may be used to advantage wherever a clutching action between two rotatable parts is desired, particularly where such action is to be automatically responsive to desired conditions of relative rotatable speeds of the two members to be clutched or declutched.

While I do not limit my invention, in its broader aspects, to any particular relationship of spring forces and centrifugal forces acting on the pawls, I prefer to provide the pawls in substantially balanced or floating condition at the speed of rotation of the pawl cage where clutching action is desired. Thus, I prefer to arrange the spring rate so that at the critical speed of clutch engagement, the centrifugal force acting on any pawl will be substantially counterbalanced by the pull of the pawl spring so that the pawl can readily move outwardly into clutching position. At the end of the outward pawl movement, the increased centrifugal force due to the outward displacement of the center of gravity of any pawl is preferably also substantially counterbalanced by the inward pull of the spring associated therewith. Centrifugal force is proportional to the distance of the center of gravity of a rotating mass from its axis, and the increase of this force due to the increase of the center of gravity distance, is counterbalanced by an increase of the spring load occasioned by the pawl movement. The spring rate is thus one which balances the increase in centrifugal force during outward pawl movement.

Heretofore, in centrifugal clutches of the general type referred to, the pawls had their respective centers of mass located generally within the mass of the pawl engaging portion and near the outer periphery of the pawl cage or companion clutching member with the result that a very great centrifugal force is exerted on such prior type pawls. Centrifugal force is proportional to the distance from the axis of rotation to the center of mass, as aforesaid. Therefore, the initial spring load required to prevent pawl actuation before the predetermined critical speed is reached often becomes excessive requiring relatively large diameter of spring wire which cannot be conveniently or properly assembled in the relatively small spaces usually available. Such springs are also difficult to shape to satisfy load requirements since the width of the pawl space available for torsion coils of the spring is limited.

However, by reason of my invention, the engaging portion of the pawl is partially counterbalanced by the opposite end whereby to reduce the distance from the axis to the center of mass of the pawl. Thus the distance of the center of mass can be controlled and in my illustration, this distance is substantially the same as the pawl travel, although such a relationship may vary as desired. In Fig. 3, I have illustrated the approximate center of mass of each pawl by the point X, the effective distance from the axis in the direction of pawl movement being relatively small. In other words, it is only the relative component of the centrifugal force acting at X in the direction of the pawl movement which controls the pawl clutching and declutching characteristics.

With my pawl, the springs 54 may be relatively long and can therefore be readily designed with the desired spring rate without inconvenience or difficulty. The spring adjustment, by reason of the bolts 56, will readily accommodate variations in critical speeds although for wide variations it is often preferable to substitute another spring of the desired stiffness and rate.

Furthermore, I do not limit my invention, in the broader aspects thereof, to the particular combination and arrangement of parts shown and described for illustrative purposes, since various modifications will be apparent within the teachings of my invention as defined in the appended claims.

What I claim is:

1. In a centrifugally operated clutch, a rotatable shell formed with a plurality of pawl receiving slots, a rotatable cage provided with a plurality of pawls substantially diametrically arranged, said pawls being actuated in response to centrifugal force and having portions adapted to engage said slots, each of said pawls having a guide portion positioned substantially diametrically opposite its engaging portion and a spring abutment portion intermediate said engaging portion and guide portion thereof, members carried by said cage and respectively associated with said pawl abutment portions, and a spring acting between each of said members and abutment portions.

2. In a centrifugally operated clutch, a rotatable shell formed with a plurality of pawl receiving slots, a rotatable cage provided with a plurality of pawls substantially diametrically arranged, said pawls being actuated in response to centrifugal force and having portions adapted to engage said slots, each of said pawls having a guide portion positioned substantially diametrically opposite its engaging portion and a spring abutment portion intermediate said engaging portion and guide portion thereof, members carried by said cage and respectively associated with said pawl abutment portions, and a spring acting between each of said members and abutment portions, said cage having outwardly extending openings respectively aligned with said springs to accommodate removal thereof with said cage and shell in their cooperating positions.

3. In a clutch for drivingly connecting driving and driven shaft members, a pawl carrying structure drivingly connected to one of said shaft members, a pawl receiving structure drivingly connected to the other of said shaft members, a pawl carried by said pawl carrying structure and adapted for clutching movement by centrifugal force exerted thereon in response to substantially synchronized rotation of said structures at or above a predetermined speed, said pawl having a clutching portion thereof, said pawl receiving structure being adapted to receive said pawl clutching portion to provide a positive connection between said structures, yielding means acting on said pawl in opposition to said centrifugal force for urging said pawl clutching portion to its disengaged position, said pawl having a guide portion slidably engaging said pawl carrying structure substantially diametrically opposite said pawl clutching portion, one of said shaft members extending axially through said pawl carrying structure, said pawl having a portion intermediate said clutching and guide portions disposed to one side of the last said shaft member.

4. In a clutch for drivingly connecting driving and driven members, a pawl carrying structure drivingly connected to one of said members, a pawl receiving structure drivingly connected to the other of said members, a pawl carried by said pawl carrying structure and adapted for clutching movement by centrifugal force exerted thereon in response to substantially synchronized rotation of said structures at or above a predetermined speed, said pawl having a clutching end portion thereof, said pawl receiving structure being adapted to receive said pawl clutching portion to provide a positive connection between said structures, a coil spring acting on said pawl in opposition to said centrifugal force for urging said pawl clutching portion to its disengaged position, said member to which said pawl carrying structure is connected lying axially within said pawl carrying structure, said pawl having a second portion thereof extending inwardly of the pawl carrying structure and partially around the last said member, said pawl carrying structure having an opening substantially diametrically opposite said clutching end portion of said pawl, said opening extending inwardly of the pawl carrying structure from the outer periphery thereof, the other end of said pawl being disposed in said opening.

5. In a clutch for drivingly connecting driving and driven members, a pawl carrying structure drivingly connected to one of said members, a pawl receiving structure drivingly connected to the other of said members, a plurality of pawls carried by said pawl carrying structure and adapted for clutching movement, said pawl receiving structure being adapted to receive said pawls to positively connect said structures in response to substantially synchronized rotation of said structures at or above a predetermined speed, and yielding means urging said pawls to their disengaged position, said pawls having yoke portions acted on by said yielding means, said yoke portions extending at least partially around said member to which said pawl carrying structure is connected.

6. In a clutch for drivingly connecting driving and driven members, a pawl carrying structure drivingly connected to one of said members, a pawl receiving structure drivingly connected to the other of said members, a plurality of pawls carried by said pawl carrying structure and adapted for clutching movement by centrifugal force exerted thereon in response to substantially synchronized rotation of said structures at or above a predetermined speed, said pawls having clutching portions, said pawl receiving structure being adapted to receive said pawl clutching portions to provide a positive connection between said structures, yielding means acting on said pawls in opposition to said centrifugal force for urging said pawl clutching portions to their disengaged positions, and releasable means connecting a plurality of said pawls, said releasable means holding said connected pawls against relative movement but releasing said pawls for clutching movement thereof as aforesaid.

7. In a clutch for drivingly connecting driving and driven members, a pawl carrying structure drivingly connected to one of said members, a pawl receiving structure drivingly connected to the other of said members, a pawl carried by said pawl carrying structure and adapted for outward clutching movement by centrifugal force exerted thereon in response to rotation of said pawl carrying structure, said pawl receiving structure being adapted to receive said pawl to drivingly and positively connect said members when said structures are operated at substantially the same speed of rotation, yielding means acting on said pawl in opposition to said centrifugal force, said yielding means having the characteristic of substantially counterbalancing the centrifugal force acting on said pawl at the extreme positions of movement thereof for substantially the minimum rotational speed of said pawl carrying structure which is sufficient to produce a centrifugal force acting to overcome said yielding means, and releasable means holding said pawl against outward movement at said minimum rotational speed of said pawl carrying structure, said releasable means being adapted to release said pawl in response to an increase in the rotational speed of said pawl carrying structure relative to said minimum speed.

8. In a device for drivingly connecting driving and driven members, a pawl carrying structure drivingly connected to one of said members, a pawl receiving structure drivingly connected to the other of said members, said pawl receiving structure having a substantially cylindrical shell formed with a slot extending outwardly therein, a pawl carried by said pawl carrying strructure and having a clutching portion thereof adapted for projection into said slot in response to rotation of said structures at substantially the same predetermined speed, said pawl carrying structure having a guideway extending outwardly thereof and slidably accommodating said pawl clutching portion, said pawl having an integral yoke portion extending at least partially around the axis of rotation of said pawl carrying structure to provide a spring seat, and a coil spring spaced circumferentially beyond said guideway and thrusting on said spring seat for urging said pawl to its retracted position.

9. In a clutch, clutching members respectively provided with a pawl and a pawl-receiving slot, said slot being adapted to receive said pawl on rotational synchronization of said members at or above a predetermined speed to positively drivingly connect said members, said pawl having a yoke portion curving at least partially around the axis of rotation of said clutching members to provide an abutment, yielding means acting on said abutment for opposing the centrifugal force acting on said pawl to urge said pawl to its declutched position, and latch means acting on said pawl, said latch means being released only when said members are synchronized at or above said predetermined speed.

10. In a clutch, a rotatable shell having a slot, means including a centrifugal force actuated pawl rotatable within said shell and adapted for projection into said slot when said pawl and shell are rotated at substantially the same speed at or above a predetermined minimum speed, a coil spring carried by said rotatable means and acting on said pawl, a bolt carried by said rotatable means and extending through said spring to provide an adjustable abutment for said spring, said abutment being adapted for alignment with said slot for adjustment thereof through said slot.

11. In a clutch, a rotatable shell having a slot, means including a centrifugal force actuated pawl rotatable within said shell and adapted for projection into said slot when said pawl and shell are rotated at substantially the same speed at or above a predetermined minimum speed, a coil spring carried by said rotatable means and acting on said pawl in opposition to the centrifugal force for retracting said pawl from said slot, and means for adjusting said spring, said adjusting means being accessible through said slot for adjustment thereof, said slot being so arranged as to accommodate outward removal of said spring therethrough.

12. In a centrifugally operated clutch for drivingly connecting relatively rotatable shafts, a rotatable shell formed with a pawl-receiving slot, a rotatable cage provided with a pawl actuated in response to centrifugal force and having a portion thereof adapted to engage said slot, one of said shafts extending axially through said cage, said pawl having a guide portion disposed substantially diametrically opposite its engaging portion, and a spring acting on said pawl in opposition to centrifugal force movement thereof.

13. In a centrifugally operated clutch for drivingly connecting relatively rotatable shafts, a rotatable shell formed with a pawl-receiving slot, a rotatable cage provided with a pawl actuated in response to centrifugal force and having a portion thereof adapted to engage said slot, one of said shafts extending axially through said cage, said pawl having a guide portion disposed substantially diametrically opposite its engaging portion and a spring abutment portion intermediate said engaging portion and guide portion thereof, said intermediate pawl portion extending at least partially around the last said shaft, and a spring acting on said abutment portion in opposition to said centrifugal force pawl movement.

14. In a centrifugal clutch, a rotatable shell having a plurality of slots, means including a pair of centrifugal force operated pawls rotatable within said shell, each of said pawls having a portion thereof adapted for projection into one of said slots when said pawls and shell are rotated at substantially the same speed at or above a predetermined minimum speed, and a pair of coil springs each having one end thereof acting on one of said pawls in opposition to movement thereof by centrifugal force, means for seating the other end of each of said coil springs on a part carried by said rotatable means, said springs being disposed adjacent opposite sides of the axis of rotation of said pawls.

15. In a centrifugal clutch, a rotatable shell having a plurality of slots, a pawl carrying structure rotatable within said shell and having a pair of substantially diametrically arranged outwardly extending openings, a pair of pawls carried by said structure, each of said pawls having end portions slidable in both of said openings, one of said end portions of each of said pawls being adapted for projection into one of said slots.

16. In a centrifugal clutch, a rotatable shell having a plurality of slots, a pawl carrying structure rotatable within said shell and having a pair of substantially diametrically arranged outwardly extending openings, a pair of pawls carried by said structure, each of said pawls having end portions slidable in said openings, one of said end portions of each of said pawls being adapted for projection into one of said slots, the other of said end portions of each of said pawls slidably engaging the other of said pawls.

17. In a centrifugal clutch, a rotatable shell having a plurality of slots, a pawl carrying structure rotatable within said shell and having a pair of substantially diametrically arranged outwardly extending openings, a pair of pawls carried by said structure, each of said pawls having end portions slidable in both of said openings, one of said end portions of each of said pawls being adapted for projection into one of said slots, and yielding means acting on each of said pawls intermediate said end portions thereof.

18. In a centrifugally operated clutch, a rotatable shell having a pawl-receiving slot, a rotatable cage mounted on a shaft concentric with the shell and carrying a pawl actuated by centrifugal force, said pawl having an end clutching portion adapted to engage said slot, said pawl having a yoke portion extending inwardly of said cage and at least partially around said shaft to provide a spring seat relatively remotely spaced from said clutching end portion, said yoke portion terminating in a pawl portion disposed approximately diametrically opposite said slot engaging end portion, and a spring acting on said spring seat.

19. In a centrifugally operated clutch for drivingly connecting coaxial relatively rotatable driving and driven shafts, relatively rotatable pawl carrying and pawl engaging clutching structures, one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force movement of said pawl clutching portion, and yielding means acting on said pawl to oppose clutching movement thereof.

20. In a centrifugally operated clutch for drivingly connecting coaxial relatively rotatable driving and driven shafts, relatively rotatable pawl carrying and pawl engaging clutching structures, one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force movement of said pawl clutching portion, and yielding means acting on said pawl to oppose clutching movement thereof, said pawl having an intermediate portion connecting said clutching and counterbalancing portions, said intermediate pawl portion extending adjacent to and at least partially around one of said shafts.

21. In a centrifugally operated clutch for drivingly connecting coaxial relatively rotatable driving and driven shafts, relatively rotatable pawl carrying and pawl engaging clutching structures one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force movement of said pawl clutching portion, said pawl having an intermediate portion connecting said clutching and counterbalancing portions, said intermediate pawl portion extending adjacent to and at least partially around one of said shafts, and a coil spring seated on one of said pawl portions other than said pawl clutching portion, said coil spring acting to yieldingly oppose said pawl clutching movement.

22. In a centrifugally operated clutch for drivingly connecting coaxial relatively rotatable driving and driven shafts, relatively rotatable pawl carrying and pawl engaging clutching structures, one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force movement of said pawl clutching portion, and yielding means acting on said pawl to oppose clutching movement thereof, said pawl having an intermediate portion connecting said clutching and counter-balancing portions, said intermediate pawl portion extending adjacent to and at least partially around one of said shafts, said pawl carrying structure having a pair of substantially diametrically opposite slideways extending outwardly thereof adjacent said pawl engaging structure, said slideways each having an oppositely extending wall respectively slidably engaging said pawl clutching and pawl counterbalancing portions.

23. In a centrifugally operated clutch for drivingly connecting coaxial relatively rotatable driving and driven shafts, relatively rotatable pawl carrying and pawl engaging clutching structures one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force movement of said pawl clutching portion, said counterbalancing pawl portion being so constructed and arranged in relation to said clutching portion as to locate the center of mass of the pawl relatively closely to the axis of rotation of the pawl carrying structure, the effective center of mass distance from said axis in the direction of pawl movement being relatively small and susbtantially equal to the distance of pawl movement during clutch engagement, and yielding means opposing said pawl clutching movement.

24. In centrifugal clutching means for drivingly connecting coaxial relatively rotatable shafts, slot carrying means drivingly connected to one of said shafts, pawl carrying means drivingly connected to the other of said shafts and including a pair of pawls slidably disposed for movement by centrifugal force, yielding means opposing the centrifugal force movement of said pawls, each of said pawls having a clutching portion adapted to enter a slot of said slot carrying means when such pawl and slot are rotated at substantially the predetermined same speed, and ball detent means interconnecting said pawls for controlling movement thereof.

25. In a centrifugally operated clutch for drivingly connecting coaxial relatively rotatable driving and driven shafts, relatively rotatable pawl carrying and pawl engaging clutching structures one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force movement of said pawl clutching portion, said counterbalancing portion including a spring seat disposed to one side of a plane through the axis of the pawl carrying structure perpendicular to the direction of movement of said pawl clutching portion, said pawl clutching portion being disposed to the other side of said plane, and a coil spring acting on said spring seat to oppose clutching movement of the pawl.

26. In a centrifugally operated clutch for drivingly connecting coaxial relatively rotatable driving and driven shafts, relatively rotatable pawl carrying and pawl engaging clutching structures one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force movement of said pawl clutching portion, said counterbalancing portion including a spring seat disposed to one side of a plane through the axis of the pawl carrying structure perpendicular to the direction of movement of said pawl clutching portion, said pawl clutching portion being disposed to the other side of said plane, and a coil spring acting on said spring seat to oppose clutching movement of the pawl, one of said shafts extending axially through said pawl carrying structure.

WALTER F. PLOETZ.